INVENTORS
Otis B. Sutton &
Curtis C. Coons
BY Harry S. Dumarst
ATTORNEY.

Aug. 7, 1951    O. B. SUTTON ET AL    2,563,755
ELECTRIC TOASTER
Filed Nov. 4, 1947    6 Sheets-Sheet 3

INVENTORS
Otis B. Sutton &
Curtis C. Coons
BY
Harry S. Duncan
ATTORNEY.

INVENTORS
Otis B. Sutton &
Curtis C. Coons
BY Harry S. Dumaree
ATTORNEY.

Aug. 7, 1951  O. B. SUTTON ET AL  2,563,755
ELECTRIC TOASTER
Filed Nov. 4, 1947  6 Sheets-Sheet 5

INVENTORS
Otis B. Sutton &
Curtis C. Coons
BY
Harry S. Dunarr
ATTORNEY.

Aug. 7, 1951     O. B. SUTTON ET AL     2,563,755
ELECTRIC TOASTER
Filed Nov. 4, 1947     6 Sheets-Sheet 6

INVENTORS
Otis B. Sutton &
Curtis C. Coons
BY
Harry S. Demarre
ATTORNEY.

Patented Aug. 7, 1951

2,563,755

UNITED STATES PATENT OFFICE 2,563,755

ELECTRIC TOASTER

Otis B. Sutton, Canton, and Curtis C. Coons, North Canton, Ohio, assignors to The Hoover Company, North Canton, Ohio, a corporation of Ohio Application November 4, 1947, Serial No. 783,876

25 Claims. (Cl. 99—329)

This invention relates to electric toasters and more particularly to a thermal timer therefor for timing the duration of the toasting intervals.

It has been proposed to time the duration of an electric toaster by a thermal timer in which the toasting interval is determined by the time it takes for a thermally responsive element to heat up and move from its cold position to its hot position. Such timers have the disadvantage that it is necessary to wait for the timer to cool before a second toasting operation can be begun or to provide some special means for quickly cooling the thermally responsive element after a previous toasting operation.

It has also been proposed to time the toasting interval by the time it takes a thermally responsive element to move from its hot position to its cold position upon being cooled. Such timers have the inherent disadvantage that for each toasting operation it is necessary to heat the thermally responsive element to a predetermined high temperature before a succeeding toasting operation can be begun.

According to this invention the first toasting interval is timed by the time it takes a thermally responsive element to move from its cold position to its hot position, then from its hot position to its cold position and from its cold position back to its hot position. For succeeding toasting operations the toasting interval is timed by the time it takes for a thermally responsive element to move from its hot position to its cold position upon cooling and to return to its hot position upon being reheated. This eliminates all waiting by the operator. Furthermore, according to this invention, it is possible to heat the thermally responsive element to its hot position before beginning a toasting operation. In such case, all toasting intervals will be timed by the time it takes a thermally responsive element to cool and move to its cold position and to heat up again upon being reheated and move to its hot position. However, the mechanism is so constructed that in either mode of operation the time interval for the first toasting operation will be substantially the same. In the mode of operation in which the thermally responsive element is not preheated the timing mechanism will automatically go into proper operation after the first toasting operation so as to time succeeding toasting intervals by the cool-off, heat-up method without any further attention from the operator.

Furthermore, since the greatest portion of the toasting interval is determined by the time it takes for the thermally responsive element to cool off, the first toasting interval will be substantially the same whether the thermally responsive element is previously heated to its hot position or the toasting operation is begun when the thermally responsive element is in its cold position.

According to another feature of this invention the thermally responsive element is automatically maintained in its hot position ready for another toasting operation even though the second toasting operation does not immediately follow a previous one.

Thermal timers which operate on the heat-up principle of operation have an inherent tendency to over-compensate. That is, as the toaster as a whole heats up with rapid repeated use, the thermally responsive element also heats up but at a faster rate. Thus, if the timer is properly set for the first toasting operation, it will shorten the succeeding toasting intervals to such an extent that the toast will be underdone unless some means is provided for preventing it.

Conversely, thermal timers which operate on the cool-off principle of operation are inherently under-compensated. That is, as the toaster as a whole heats up the bread will be toasted faster and it is necessary to shorten the timing intervals as the toaster heats up. However, the thermal timer also heats up and is hotter at the start of a toasting interval after the first so that it will take longer for the thermal timer to cool off and the timing interval will be lengthened rather than shortened as is necessary.

According to this invention all timing intervals, after the first, operate on the cool-off, heat-up principle of operation. The tendency of such a timer is therefore to balance the over-compensating tendency of the heat-up timer against the under-compensating tendency of the cool-off timer. However, the heating up period forms the smaller portion of the entire toast timing interval and the cooling-off period the larger. The timer therefore has an overall tendency to under-compensate and it is necessary to provide some means for decreasing the duration of succeeding toasting intervals with rises in toaster temperature.

According to another feature of this invention, an auxiliary thermally responsive element is provided which acts upon the main thermal timer in such a manner that the upper temperature limit to which the thermal timer is heated is progressively decreased with rises in toaster temperature so that the cooling off period is reduced sufficiently to take care of the added residual heat in the thermal timer to shorten the timing intervals with rises in toaster temperature.

According to another feature of this invention, a manual adjustment is provided for adjusting the duration of the toasting interval for making light, medium or dark toast according to the desires of the user.

More specifically, according to this invention, the upper temperature limit of the thermally responsive element is varied to vary the cooling off period of the thermally responsive element and thus vary the timing interval.

Other objects and advantages of this invention will become apparent as the description proceeds when taken in connection with the accompanying drawings in which.

Figure 1:
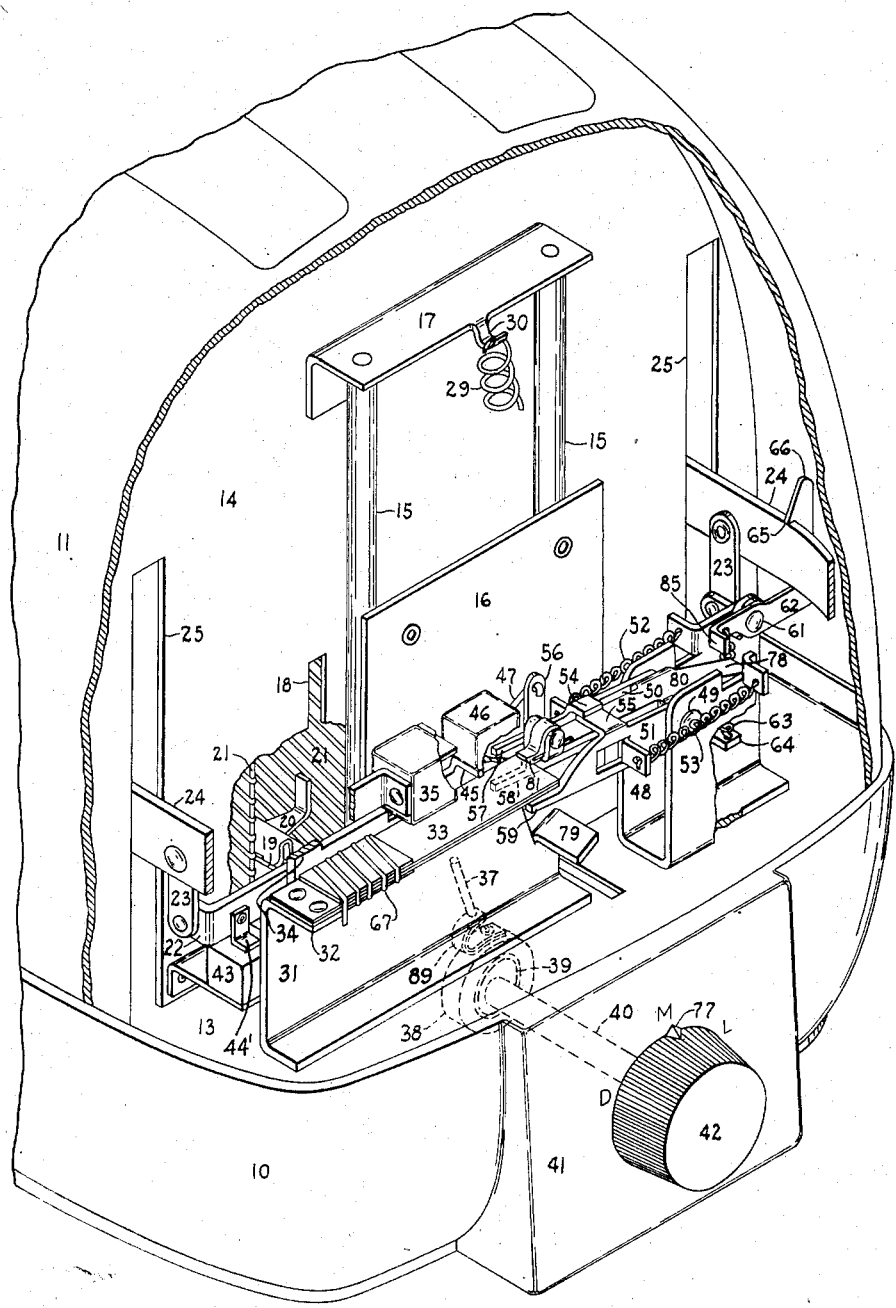
Figure 1 is a perspective view of a toaster with the parts broken away to show the details of one modification of the timer according to this invention.
Figure 2:
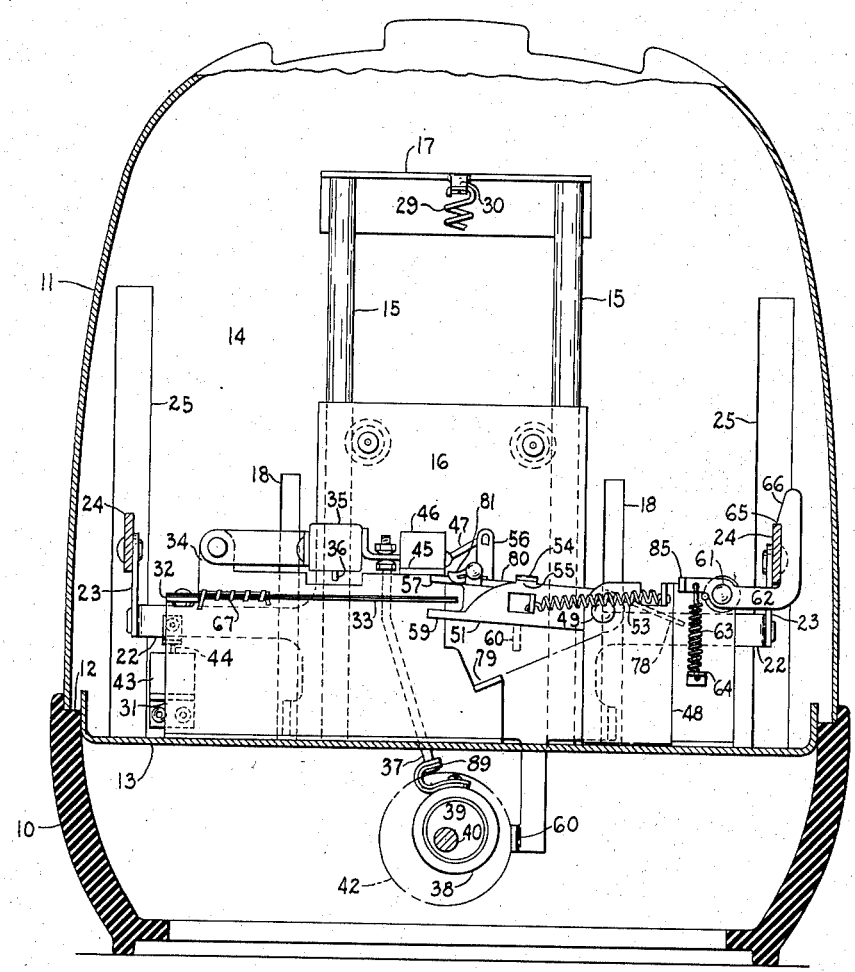
Figure 2 shows a vertical cross-sectional view of the toaster and timer of Figure 1.
Figure 3:
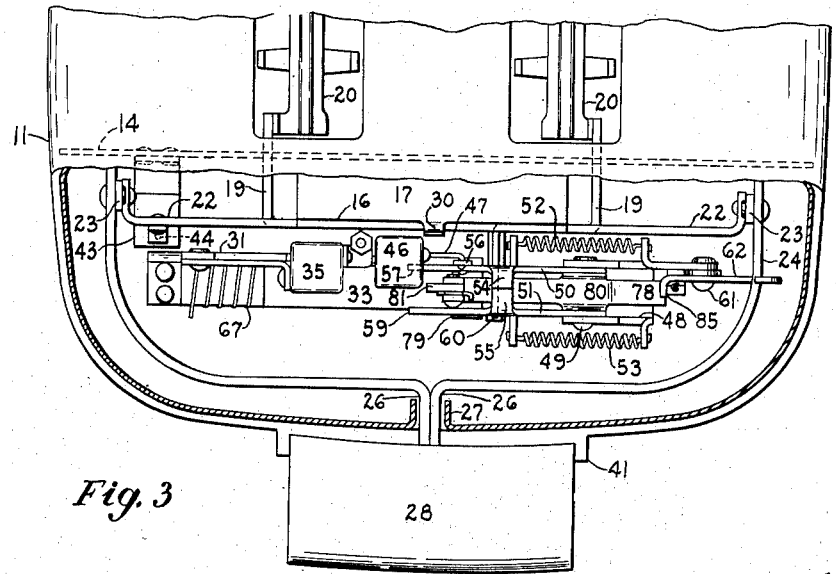
Figure 3 shows a view of the toaster and timer of Figure 1 looking downwardly, with the walls of the toaster broken away to show the details of the timer.

Referring to the drawings and especially Figures 1 and 2 thereof, the reference numeral 10 represents a base of molded plastic such as hard rubber, phenolic condensation product or equivalent material. An appearance housing 11 is supported on a shoulder 12 of base 10. A supporting plate 13 is supported on the inner periphery of the base 10 inwardly of the shoulder 12. The supporting plate 13 supports the entire mechanism of the toaster and timer of this invention. A dividing plate 14 extends upwardly from the supporting plate 13 and divides the interior of toaster into a toasting chamber and a mechanism compartment.

Mounted upon the supporting plate 13 are a pair of guide rods 15, which form guides for a pair of vertically reciprocating carriage plate 16 in a manner well known in the art. The guide rods 15 extend vertically in front of the dividing plate 14 and are attached at their upper end to the plate 14 by a bracket 17.

Struck rearwardly from the carriage plate 16 and extending through vertically extending slots 18 in the dividing plate 14 are a pair of arms 19 to which are attached bread carriers 20. The bread carriers 20 are positioned between spaced heating elements 21 which provide the heat for performing the toasting function.

Extending outwardly and rearwardly from the carriage plate 16 are a pair of arms 22. A pair of links 23 are pivoted at their lower ends to the rearwardly extending portions of the arms 22, and at their upper end are pivoted to a pair of arms 24, which in turn are pivoted at their rear end to the walls of the oven chamber in a manner well known in the art. Vertically extending slots 25 are provided in the dividing plate 14 to permit vertical movement of the forward ends of the arms 24. At their forward end the arms 24 are extended forwardly at 26 through a vertically extending slot 27 in the appearance housing 11. Attached to the forwardly extending portion 26 of the arms 24 is a manipulating handle 28 by which the bread carriers 20 and the carriage plate 16 are moved to toasting position. The bread carriers 20 and the carriage plate 16 are biased to bread receiving position by a spring 29, anchored at its upper end to the bracket 17 by a hook 30 and at its lower end to the arms 24 by any suitable anchoring means (not shown).

Extending upwardly from the supporting plate 13 is a bracket 31, having a forwardly extending lug 32, which supports one end of a bimetallic thermally responsive element 33 which constitutes the thermal timer. Pivotally mounted on a lug 34 extending upwardly from the bracket 31 is an on-off switch 35 which is normally closed and is opened by operation of the operating plunger 36. The switch 35 is adapted to be moved toward and away from the bimetal timer 33 by means of a link 37, rigidly attached to the switch 35 at one end and to a U-shaped compensating bimetal 89 at its other end. The compensating bimetal 89 is rigidly attached to an eccentric 38 which encircles a cam 39 rigidly attached to a shaft 40 extending through a protuberance 41 at the front of the base 10. A manipulating knob 42 is also rigidly attached to a shaft 40 so that rotation of the knob 42 will move the switch 35 bodily toward and away from the bimetal timer 33 for a purpose to be described hereinafter.

Mounted on base plate 13 is an on-off switch 43 which is normally open and may be closed by depression of the plunger 44 by a lug 44' struck forwardly from one of the arms 22. This switch 43 opens and closes the circuit to the heaters 21 as will be explained hereinafter.

Mounted on a forwardly extending lug 45 of bracket 31 above the bimetal 33 is a switch 46. The switch 46 is adapted to be opened and closed by a lever arm 47 in such manner that when the lever arm 47 is in its upward position the switch 46 is closed and when it is in its lower position the switch 46 will be open.

Figure 4:
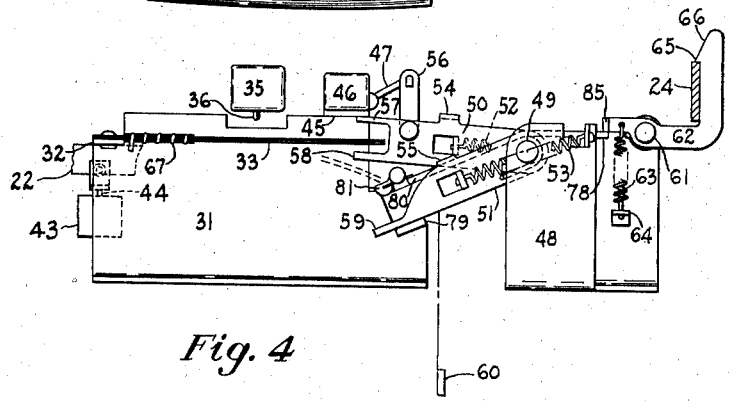
Figure 4 is a diagrammatic view of the timer of Figure 1 showing the position of the various parts with the thermally responsive element cold and the bread carriers in downward or toasting position.

Also mounted on supporting plate 13 is a U-shaped bracket 48. Pivotally mounted between the arms of the U-shaped bracket 48 as at 49 are a pair of toggle arms 50 and 51 and a latch release lever 80. Pivotally mounted on the end of the latch release lever 80 is a pawl 81 for a purpose to be hereinafter described. As shown in Figures 2 and 4 the tail end 78 of latch release lever 80 is bent downwardly from the body of the lever for a purpose which will be described hereinatfer. Toggle arms 50 and 51 are adapted to be snapped from an upper over-center position to a lower over-center position and vice versa by toggle springs 52 and 53 respectively which are anchored at one end to struck out lugs on the toggle arms and at their other ends to struck out lugs on the bracket 48. Toggle arm 50 has a struck out lug 54 overlying a struck out lug 55 on toggle arm 51 for a purpose to be hereinafter described. Both of the lugs 54 and 55 overlie the latch release lever 80 so that latch release lever 80 will be moved counter-clockwise when either or both of the toggle arms 50 and 51 are in their downward overcenter position.

Near the free end of the toggle arm 50 is a pivoted link 56 pivoted at its upper end to the operating arm 47 of the switch 46. The toggle arm 50 has a pair of legs 57 and 58 straddling the free end of the bimetal timer 33. The toggle lever 51 has a lug 59 underlying the free end of the bimetal timer 33. Extending forwardly from the carriage plate 16 is a lug 60 (Fig. 2) which underlies the toggle arms 50 and 51 for a purpose to be hereinafter described. Struck forwardly from bracket 31 is a lug 79 which forms a stop for toggle arms 50 and 51 when in their downward over-center position.

Pivoted to the bracket 48 at 61 is a latch arm 62 which is spring-biased to latching position by a spring 63 secured at its lower end to the free end of a lug 64. A lug 85 on the tail end of latch lever 62 cooperates with the end 78 of latch release lever 80 as will be explained. Latch lever 62 has a hook 65 which overlies one of the arms 24 to hold the bread carriers 20 in toasting position when they are moved downwardly to that position. Above the hook 65, the latch arm 62 is provided with a cam 66 to bias the arm 62 clockwise when the arms 24 are moved downwardly.

An auxiliary heater 67 surrounds the bimetal timer 33 and is adapted to be energized and deenergized in a manner to be explained hereinafter for timing the duration of the toasting interval.

Operation of Figures 1 to 5

Figure 5:
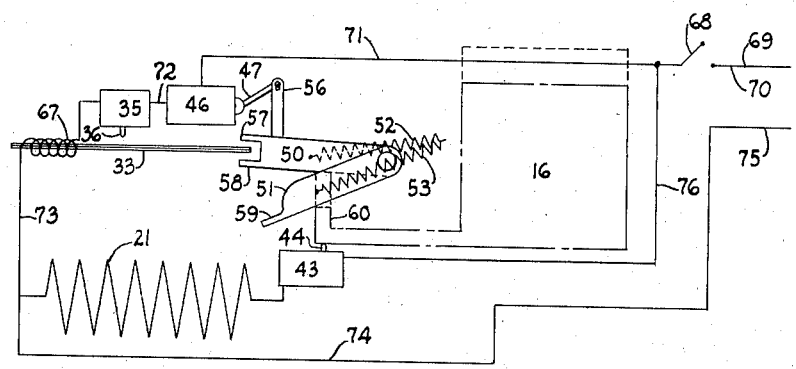
Figure 5 is a wiring diagram showing the parts in the position they occupy when the thermal element is cold and the bread carriers in downward position.

One mode of operation is to insert bread through the openings in the appearance housing 11 so as to rest on carriers 20 and move the actuating knob 28 downwardly to move carriers 20 to toasting position and to then close the manual switch 68 (Fig. 5).

However, assume that the operator closes the manual switch 68 sometime prior to the time he desires toast. Referring to Figure 5 the main heaters 21 will remain deenergized because the switch 43 will be open. The auxiliary heater 67 will be energized from line wire 69 by conductor 70, closed switch 68, conductor 71, closed switch 46, conductor 72, closed switch 35, auxiliary heater 67, conductor 73 and conductor 74 to the line wire 75.

The bimetal timer 33 is so made that it moves downwardly when heated, that is, the upper layer has the higher coefficient of expansion. Energization of the auxiliary heater 67 will cause the bimetal timer 33 to move downwardly and engage the leg 58 of toggle arm 50 and the lug 59 of toggle arm 51. This will cause the toggle arms 50 and 51 to move downwardly slightly against the bias of springs 52 and 53 until the toggle arms 50 and 51 engage the lug 60 extending forwardly from the carriage plate 16. This position of lug 60 is shown in Figure 2. The bias of the spring 29 will prevent further downward movement of the free end of the bimetal timer 33 because its free end is in engagement with the lugs 58 and 59 of toggle arms 50 and 51 which are in engagement with the lug 60 on carriage plate 16. If desired a positive latch may be provided to prevent downward movement of carriage plate 16. The bimetal 33 will then bow upwardly centrally so that its central portion will engage the plunger 36 of off-on switch 35 so as to deenergize auxiliary heater 67 and permit the bimetal timer to cool slightly. As long as the carriage plate 16 remains in upward position the central portion of bimetal 33 will oscillate back and forth so as to operate intermittently off-on switch 35 to energize and deenergize auxiliary heater and thus maintain the bimetal timer 33 in a hot condition.

The operator will then insert bread through the openings in the appearance housing 11 so as to rest on the bread carriers 20. The manipulating handle 28 will then be grasped and moved downwardly to move carriers 20 and carriage plate 16 to toasting position. This will remove the restraining force of lug 60 from the toggle arms 50 and 51. The bimetal 33 being in its hottest position will immediately snap the toggle arms 50 and 51 to their lowermost position. The lugs 54 and 55 will move the latch release lever 80 to the position shown in Figure 4, with tail 78 of lever 80 underlying lug 85 of latch release lever 62. As will appear hereinafter the pawl 81 always is above the free end of bimetal 33 at the start of a toasting operation and it will remain above it as it moves clockwise by the lugs 54 and 55.

Movement of toggle arm 51 downwardly will cause the switch 46 to be opened by the linkage 56 and 47 to completely deenergize auxiliary heater 67 and permit bimetal 33 to cool and to move upwardly to its cold position. The arm 24 will engage cam 66 of latch lever 62 to move it clockwise until the hook 65 overlies the arm 24 so as to latch the carriers 20 and carriage plate 16 in toasting position.

At the same time the lug 44' will depress plunger 44 of off-on switch 43 to close the switch 43 so as to energize the main heaters 21 as follows: line wire 69, conductor 70, closed switch 68, conductor 76, closed switch 43, heaters 21 and conductor 74 to line wire 75.

The toasting operation will then proceed as the bimetal 33 cools and moves upwardly again to its cold poition. During this movement the free end of bimetal 33 will engage leg 57 of toggle arm 50 until the toggle arm 50 moves past its dead center position while the toggle arm 51 remains in the position shown in Figure 4. During this movement the free end of bimetal 33 moves above the pawl 81 on the latch release lever 80 because the pawl 81 is pivoted to move upwardly freely. Movement of the toggle arm 50 to its upward position will cause the switch 46 to be closed by the linkage 56 and 47 while the switch 35 will also be closed because the bimetal 33 previously disengaged the plunger 36. This will reenergize the auxiliary heater 67 while the main heaters 21 remain energized because the switch 43 is closed by lug 44'.

The heater 67 will then reheat the bimetal timer 33 and cause it to move downwardly again to its hot position. During this movement the free end of the bimetal 33 will contact the pawl 81 and pivot the latch release arm 80 counterclockwise which in turn will move the latch arm 62 clockwise so as to remove the hook 65 from above the arm 24 whereby the bread carriers 20 and the carriage plate 16 will move upwardly under the bias of the spring 29. The arrangement of the free end of the bimetal 33 and the pawl 81 is such that the free end of the bimetal 33 will move past the end of the pawl 81 just as the hook 65 is moved from above the arm 24 so that the pawl 81 will again be positioned above the free end of the bimetal 33.

Movement of the carriage plate 16 to upward position will also move the lug 60 upwardly to the dotted line position of Figure 2 so as to pivot the toggle arms 50 and 51 clockwise causing the lugs 58 and 59 to engage the free end of the bimetal 33 and move it upwardly even though the bimetal 33 is hot at this time. The latch lever 80 will be carried along with arms 50 and 51 by the bimetal 33 so that the pawl 81 will remain above the free end of bimetal 33. This will also permit the on-off switch 43 to open and deenergize the main heaters 21.

During the foregoing toasting operation the operator can secure dark, medium or light toast as desired. If dark toast is desired the knob 42 is rotated counter-clockwise until the pointer 77 points to the letter D on the protuberance 41 of the base 10. This will rotate the cam 39 in the eccentric 38 and cause the eccentric to move upwardly. Movement of the accentric 38 upwardly also move the link 37 and switch 35 upwardly away from the central portion of the bimetal 33. Since the switch 35 is an on-off switch which maintains the upper temperature limit of bimetal 33, movement of the switch 35 away from the bimetal 33 will raise the upper temperature limit of the bimetal 33.

Figure 10:
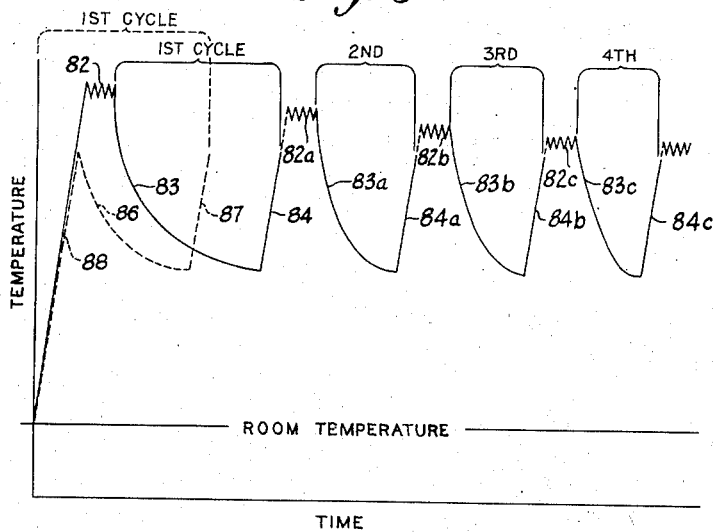
Figure 10 is a time-temperature chart showing the operation of the timer according to this invention.

Referring to Figure 10 the wavy line 82 represents the heating and cooling of the bimetal 33 before a toasting operation is begun, a line 83 the cooling off period of bimetal 33, and the line 84 the reheating period of bimetal 33.

As can be seen the major portion of the toasting interval is determined by the cooling off period of bimetal 33 represented by the line 83. Therefore, if the upper temperature limit of bimetal 33, represented by wavy line 82 is raised by movement of the switch 35 away from the bimetal 33, the entire toasting interval will be lengthened which will result in dark toast.

If medium or light toast is desired the knob 42 is rotated clockwise to position M or L which will move the switch 35 toward bimetal 33 so as to lower the upper temperature limit represented by wavy line 82 and correspondingly the length of the cooling off period of bimetal 33 represented by line 84 so as to shorten the entire toasting interval. This will result in medium or light toast as the case may be.

If now a second toasting operation is immediately begun bread is inserted as before and the manually operable handle 28 moved downwardly as before. The operation will be the same as before except for the operation of the compensating bimetal 89. The toaster as a whole will contain considerable residual heat as will the thermal timer 33. The residual heat of the toaster will be transmitted to the compensating bimetal 89 which will cause it to move downwardly and move the link 37, and correspondingly the switch 35 downwardly so that switch 35 will be positioned closer to the central portion of the bimetal 33. That will lower the upper temperature limit of the bimetal timer 33 as represented by the wavy line 82a of Figure 10 so that the bimetal timer 33 will not have to cool as much as for the initial operation. This will just compensate for the residual heat of the toaster and timer 33 so as to overcome the tendency of the bimetal timer 33 to under-compensate and shorten the second toasting interval over that of the first as indicated by the lines 83a and 84a of Figure 10.

Again referring to Figure 10 the action of the bimetal timer 33 compensated by the compensating bimetal 64 is represented. The wavy lines 82a, 82b, and 82c representing the operation of the bimetal 33 between toasting operations, the lines 83a, 83b, and 83c the cooling off period for the second, third and fourth cycles and the lines 84a, 84b, and 84c the heating up period for the second, third and fourth cycles.

As previously pointed out the toaster may be operated by inserting bread and moving the carriers down to toasting position before closing the manual switch 68. The timing interval will still be substantially the same as before. Under such circumstances the auxiliary heater 67 will be energized. The main heaters 21 will be energized and the bimetal timer 33 will start from cold position and move downward until switch 46 is operated as before the deenergize the auxiliary heater 67 whereby the bimetal timer 33 will begin to cool. However, the timer 33 will not contain as much residual heat as when maintained at its high temperature limit. Additionally it will not reach its normal high temperature limit because bimetal 33 is not restrained from movement until it reaches that limit.

As a result, a first toasting interval will be timed by the time it takes bimetal 33 to heat up, to cool off, and to heat up again. That action is represented by the dotted lines 85, 86, and 87 of Figure 10. The two heating up periods 85 and 87 are compensated by the shorter cooling off period 86 so that the toasting interval for the first cycle is the same whether or not the switch 68 is operated to bring the bimetal 33 up to temperature before the first toasting operation is begun.

Referring now to Figures 6 to 9, inclusive, the parts have been given the same reference characters as in Figures 1 to 5 where the parts are the same. The description will not be repeated where these parts are the same. Only the modified construction will be described.

Mounted on supporting plate 13 is an upstanding bracket 100 which supports the timer. A forward projecting lug 101 supports one end of bimetal timer 102 adapted to be heated by an auxiliary heater 103. Mounted on the bracket 100 above bimetal 102 is a normally closed off-on switch 104 adapted to be opened by spring 105 which holds the operating plunger 106 inwardly to open the switch. Pivoted to the opposite end of the bracket 100 is a bracket 107 which carries a compensating bimetal 108 to the outer end of which is attached two spring arms 109 and 110 which normally hold the contacts 111 and 112 closed. The bracket 107 is connected by a link 113 to the eccentric 38 whereby rotation of the knob 42 will pivot the bracket about its pivot point for a purpose to be hereinafter described.

Mounted on the base of the bracket 100 are a pair of switches 114 and 115. The switch 114 is normally open and is adapted to be closed by depression of its operating plunger 116. The switch 115 is also a normally open switch which is closed by depression of its operating plunger 117.

Pivotally mounted at 118 on the upstanding portion of bracket 100 are a pair of toggle arms 119 and 120 adapted to be snapped to opposite over-center positions against suitable stops 121, 122, 123, and 124 by a toggle spring 125.

The toggle arm 119 has a pair of projections 126 and 127 which cooperate with the free end of the bimetal 102 in a manner hereinafter to be described. The toggle arm 120 has outwardly projecting lugs 128 and 129. The lug 128 cooperates with the plunger 116 of switch 114 while the lug 129 cooperates with latch arms 130 and 131 in a manner to be hereinafter described.

The latch arm 130 is pivoted at 132 to bracket 100 and is spring-biased clockwise against a suitable stop. The latch arm 131 is pivoted to the bracket 100 at 133 and is spring-biased counter-clockwise against a suitable stop. The latch arm 130 has a hook 134 and a cam 135 which cooperate with a lug 136 extending forwardly from carrier plate 16 in a manner which will be later described. The latch arm 131 has a hook 137 and a cam 138 which also cooperate with the lug 136 in a manner to be later described. The latch arm 131 also has a cam 142 which cooperates with the projection 136 for a purpose to be described hereinafter. Pivoted to the tail end of the latch lever 130 is a pawl 139 which is free to pivot upwardly but is rigid in a downward direction.

Attached to the right hand arm 24 is a projection 140 which depresses plunger 117 to close switch 115 when the carriers are moved to downward position. Attached to the other arm 24 is a projection 141 which cooperates with the spring 105 to open the switch 104 when the carriers are moved to downward position.

Figure 9:
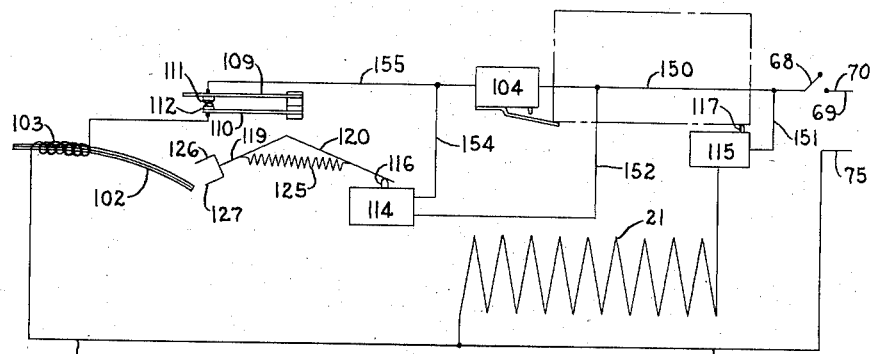
Figure 9 is a wiring diagram showing the parts in the position they accupy in Figure 8.

Referring to Figure 9, line wire 69 is connected to switch 68 by a conductor 70. The switch 68 is connected by conductors 150, 151, and 152 to one side of switches 104, 115 and 114 respectively. The other side of switch 115 is connected to one side of heaters 21 the other side of which is connected to line wire 75 by conductor 153. The other side of switches 104 and 114 are connected by conductors 154 and 155 to contact 111. Contact 112 is connected to one side of the auxiliary heater 103, the other side of which is connected to line wire 75 by conductors 156 and 153.

*Operation of Figures 6 to 9 inclusive*

It is also possible to operate this modification in two ways for the first toasting cycle.

The switch 68 may be manually closed slightly before toast is desired. This will energize the auxiliary heater 103 from line wire 69, conductor 70, switch 68, conductor 150, closed switch 104, conductor 155, contacts 111 and 112, auxiliary heater 103, conductor 156, and conductor 153 to line wire 75.

Figure 6:
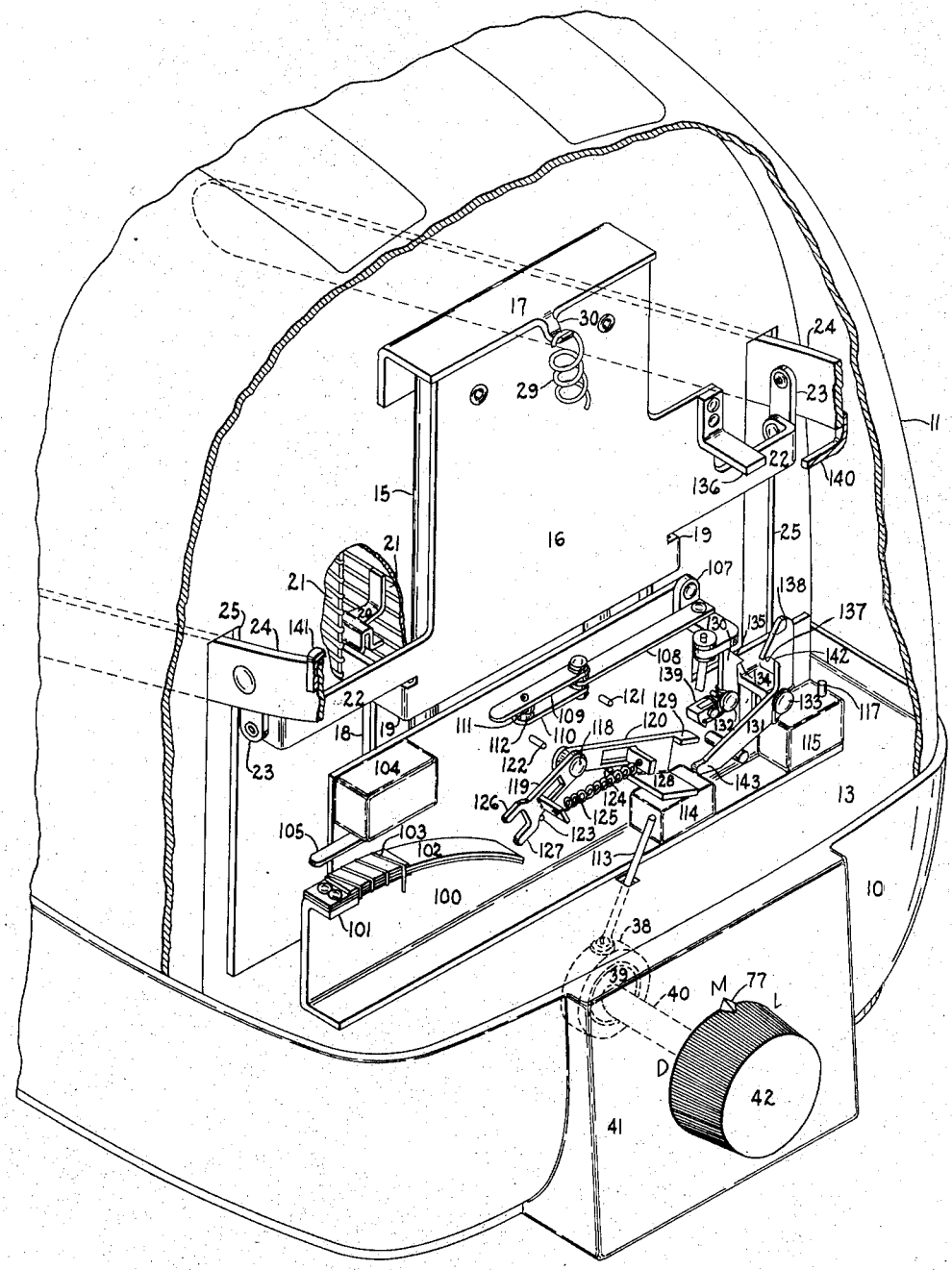
Figure 6 is a perspective view of a toaster with the parts broken away to show the details of a second modification of the timer according to this invention.
Figure 7:
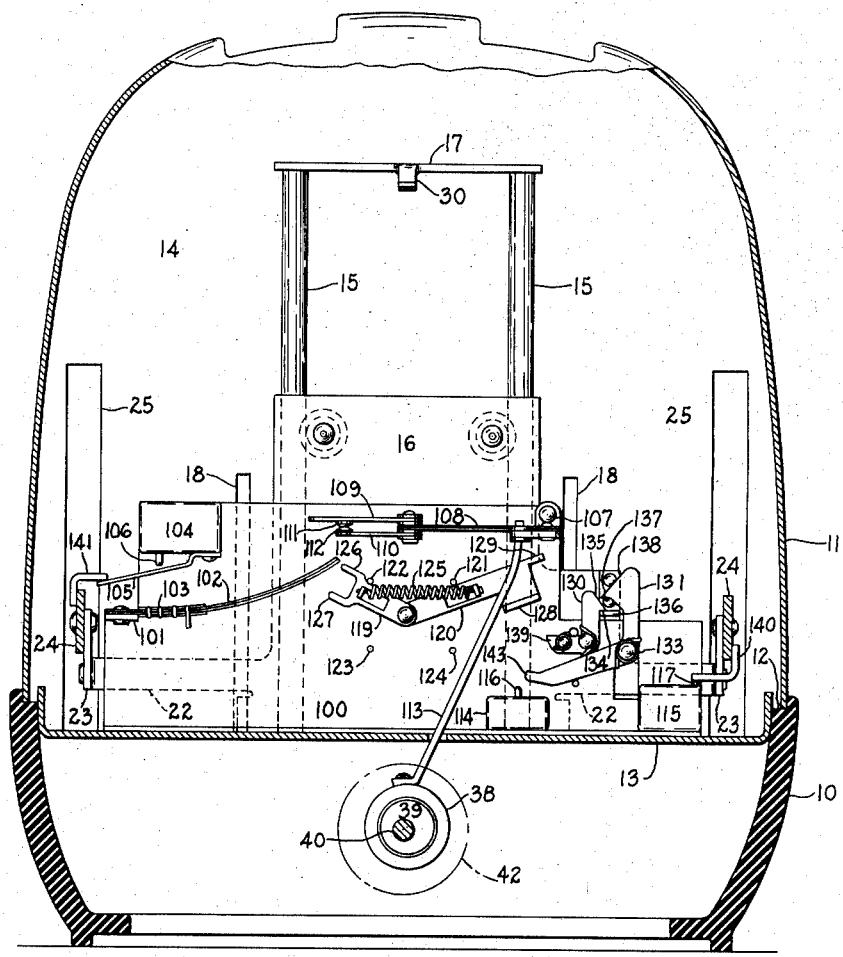
Figure 7 is a vertical cross-sectional view of the toaster and timer of Figure 6.
Figure 8:
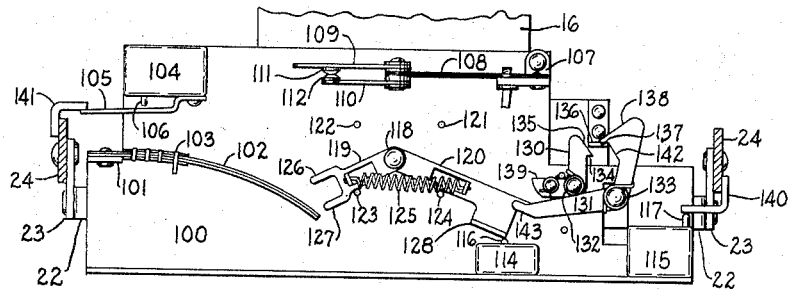
Figure 8 is a diagrammatic view of the timer of Figure 6 with the thermally responsive element in cold position and the bread carriers latched down.

This will cause the bimetal timer 102 to be heated so as to move upwardly from the position shown in Figures 6, 8, and 9 to the position shown in Figure 7. The free end of the bimetal 102 will engage the lug 126 of toggle arm 119 and move it upwardly until it moves past dead center position when both toggle arms 119 and 120 will be snapped upwardly by toggle spring 125 to the upper over-center position against the stops 121 and 122. This will permit switch 114 to open. The free end of bimetal 102 will clear the lug 126 as shown in Figure 7 and it will continue to move upwardly until it contacts the end of the spring 109 so as to separate contacts 111 and 112. This will deenergize the auxiliary heater 103 and permit the bimetal 102 to cool slightly until contacts 111 and 112 reengage to reenergize the auxiliary heater 103. The thermostatic timer 102 will then oscillate back and forth as long as carriage plate 16 remains in upward position to maintain the bimetal 102 at its upper limit temperature.

Bread is then inserted through the openings in the appearance housing 11 so as to rest on the carriers 20. The manipulating handle 28 is then grasped and moved downwardly so as to move the carriers 20, carriage plate 16 and arms 24 downwardly to toasting position. The extension 140 will contact plunger 117 to close the switch 115 and close the circuit from line wire 69, conductor 70, closed switch 68, conductor 151, closed switch 115, heaters 21, and conductor 153 to the line wire 75. At the same time the extension 141 will engage the spring 105 to open the switch 104 and deenergize the auxiliary heater 103.

Movement of the carriage plate 16 downwardly will cause extension 136 to engage the cam surfaces 135 and 138 of latch levers 130 and 131 to move them apart against their biasing springs until it engages beneath the hook 134 of latch lever 130 to hold the carriers 20 in toasting position against the bias of spring 29. It is to be noted that hook 134 of latch lever 130 is below hook 137 of latch lever 131 so that latch lever 130 will hold the carriers down when they are first moved to that position.

The bimetal 102 will then cool and move towards its lowermost cold position. Its free end will engage the lug 127 of toggle arm 119 and move that arm toward its lower position. Eventually the toggle arm 119 will move past its dead center position so that toggle spring 125 will quickly move both toggle arms 119 and 120 downwardly to their lower over-center position against the stops 123 and 124. The lug 129 of toggle arm 120 will engage the pawl 139 on the end of latch arm 130 and move the latch arm counter-clockwise until its hook 134 releases the extension 136. This will permit the carriage plate 16 and carriers 20 to move upward slightly until the hook 137 of latch arm 131 engages the extension 136 to arrest upward movement of the carriage plate 16. In moving upwardly to engage hook 137 the extension 136 rides over the cam 142 of lever 131 to move it clockwise slightly so that its end 143 will be raised upwardly into a position to be engaged by the lug 128 of toggle arm 120 when the toggle arm 120 moves upwardly again as will be described presently.

Movement of the toggle arm 120 to downward position will also cause the lug 129 to engage the plunger 116 and close switch 114 to establish a circuit from line wire 69, conductor 70, closed switch 68, conductor 150, conductor 152, closed switch 114, conductor 154, conductor 155, contacts 111 and 112, auxiliary heater 103, conductor 156, and conductor 153 to the line wire 75. This will again energize the auxiliary heater 103 to heat the bimetal timer 102 and cause it to move towards its uppermost hot position.

The free end of bimetal timer 102 will again engage the lug 126 of toggle arm 119 and move it upwardly until it snaps past its center position to permit the toggle spring 125 to snap the toggle arms 119 and 120 to their upper over-center position. This will cause the lug 128 of toggle arm 120 to engage the end 143 of latch lever 131 to rotate it clockwise to release the projection 136 from the hook 137 whereby the carriers 20 and carriage plate 16 will be moved upwardly by the spring 29.

This will open both switches 114 and 115 to deenergize the auxiliary heater 103 and the main heaters 21. However, the auxiliary heater 103 is immediately reenergized by movement of the projection 141 away from the spring 105 to permit the spring 105 to close the switch 104. The auxiliary heater 103 will then be intermittently energized as previously described to maintain the bimetal timer 102 in its hot position until the following toasting operation.

Should the operator desire dark toast the knob 42 is rotated counter-clockwise to bring the pointer 77 to the position D on the extension 41 of the base 10. This will cause the cam 39 to raise eccentric 38 and link 113 to pivot the bracket 107 clockwise. This will cause the end of the spring arm 109 to be moved farther away from the free end of the bimetal timer 102 when it is in its hot position so that it will have to be heated to a higher temperature to open the contacts 111 and 112. This will raise the upper temperature limit of the bimetal timer 102 as represented by the wavy line 82 of Figure 10 and increase the cooling off period of the bimetal 102 as represented by the line 83 of Figure 10 and correspondingly increase the duration of the entire toasting interval. This will produce dark toast.

If medium or light toast is desired a pointer 77 is turned clockwise to position M or L as desired to bring the end of the spring arm 109 closer to the free end of the bimetal timer 102 and decrease the upper temperature limit of bimetal timer 102. This will decrease the cooling period of the bimetal timer 102 and correspondingly reduce the toasting interval to produce medium or light toast as desired.

The compensating bimetal 108 also acts to vary the upper temperature limit of bimetal timer 102 so as to compensate for the tendency of the bimetal timer 102 to under-compensate. With repeated use the residual heat from the toaster will be transmitted to the compensating bimetal 108 and cause it to move downwardly and move the end of the spring 109 toward the free end of the bimetal timer 102 so as to decrease the upper temperature limit of the bimetal timer 102. This will decrease the cooling period of the bimetal timer 102 so as to decrease the toasting interval as previously described. This decrease is just sufficient to compensate for the tendency of the bimetal timer 102 to under-compensate. As in the modifications of Figures 1 to 5, inclusive, this is shown by the solid lines of Figure 10 for the various toasting cycles.

In Fig. 10 the upper limit lines 82, 82a, 82b, and 82c are shown as decreasing for a number of cycles until a condition of equilibrium is reached.

As in the modification of Figures 1 to 5, inclusive, bread may be inserted and the carriers moved to toasting position before closing the switch 68. The duration of the first toasting interval will not be materially different than when the switch 68 is previously closed to bring the bimetal timer 102 up to its hot position. Thus the first interval will be timed by the time it takes the bimetal timer to heat up, then to cool off and then to heat up again. The reduced cooling interval will thus compensate for the extra heating up interval. This is shown by the dotted lines 85, 86, and 87 of Figure 10.

During the initial heating up interval the toggle arm 120 moves upwardly, the lug 129 will merely pivot the pawl 138 upwardly to move above the pawl but will have no effect upon the latch lever 130. Likewise the lug 128 of toggle lever 120 will have no effect on the latch lever 131 because its end 143 is positioned downwardly so as to be out of the path of the lug 128. The remainder of the operation will be the same as when switch 68 is initially set to heat up the bimetal timer 102 to its hot position before a toasting operation is begun.

From the foregoing it can be seen that this invention provides a toaster having a thermal timer in which it is not necessary to wait at any time either for the thermal element to heat up or to cool off.

This invention also provides a thermal timer for a toaster with a limiting switch for maintaining the timer at its upper operating temperature with means for automatically lowering the upper temperature limit with rises in toaster temperature.

This invention also provides a thermal timer with an upper limit switch with manual means for varying the upper limit in adjusting for light, medium, and dark toast.

While we have shown but two embodiments of our invention it is to be understood that these embodiments are to be taken as illutrative only and not in a limiting sense. We do not wish to be restricted to the particular structure shown and described but wish to include all equivalent variations thereof except as limited by the scope of the claims.

We claim:

1. A toaster comprising, bread carriers movable from a bread receiving position to a toasting position, main heaters for performing the toasting function, a thermal timer for timing the duration of the toasting interval, an auxiliary heater for said thermal timer, switch means operative to energize said auxiliary heater whether said carriers are in their bread receiving or toasting position to heat said thermal timer, means for moving said carriers to toasting position, means for latching said carriers in toasting position, and control means responsive to movement of said carriers to toasting position to actuate said switch means to energize said main heaters and to deenergize said auxiliary heater to permit said timer to cool, said control means being responsive to movement of said timer upon cooling to reenergize said auxiliary heater to reheat said timer, said control being responsive to movement of said timer upon being reheated to release said latching means and to actuate said switch means to maintain said auxiliary heater energized.

2. A toaster comprising, bread carriers movable from a receiving to a toasting position, main heaters for performing the toasting function, a thermal timer movable from a cold position to a hot position when heated and back to its cold position as it cools, an auxiliary heater for said thermal timer, switch means operative to energize said auxiliary heater whether said carriers are in receiving or toasting position, control means for restraining said timer from movement from its cold position to its hot position as long as the carriers are in receiving position, means for moving said carriers to toasting position and means for latching said carriers in toasting position, said control means being responsive to movement of said carriers to toasting position to remove said restrainting means to permit said timer to move to its hot position, said control means being responsive to movement of said carriers to toasting position to actuate said switch means to energize said main heaters and to deenergize said auxiliary heater to permit said timer to cool and move to its cold position, said control means being responsive to movement of said timer to its cold position to actuate said switch means to reenergize said auxiliary heater to reheat said timer and cause it to return to its hot position and, said control means being responsive to the return of said timer to its hot position to release said latching means and to restore said restraining means to its restraining position and move said timer to its cold position.

3. A toaster comprising, bread carriers movable from a receiving position to a toasting position, main heaters for performing the toasting function, a thermal timer movable from a cold position to a hot position when heated and back to its cold position as it cools, an auxiliary heater for said timer, switch means operative to energize said auxiliary heater when said carriers are in receiving position to cause said timer to move to its hot position, control means responsive to movement of said timer to its hot position to actuate said switch means to deenergize said auxiliary heater so that said timer will start to move towards it cold position, said control means being responsive to slight movement of said timer toward its cold position to actuate said switch means to reenergize said auxiliary heater so as to maintain said timer in its hot position as long as the carriers remain in receiving position, means for moving said carriers to toasting position and means for latching said carriers in toasting position, said control means being responsive to movement of said carriers to toasting position to actuate said switch means to energize said main heaters and to deenergize said auxiliary heater to permit said timer to cool and move to its cold position, said control means being responsive to movement of said timer to its cold position to actuate said switch means to reenergize said auxiliary heater to cause said timer to return to its hot position and said control means being actuated by the return of said timer to its hot position to release said latch means to permit said carriers to return to receiving position and to actuate said switch means to deenergize said main heaters.

4. A toaster comprising, bread carriers movable from a receiving position to a toasting position and being spring-biased to receiving position, main heaters for performing the toasting function, a thermal timer movable from a cold position to a hot position when heated and back to its cold position as it cools, an auxiliary heater for said timer, switch means operative to energize said auxiliary heater when said carriers are in receiving position, means for moving said carriers to toasting position, means for latching said carriers in toasting position, and control means responsive to movement of said carriers to toasting position to actuate said switch means to energize said main heaters and to deenergize said auxiliary heater to permit said timer to cool and move to its cold position, said control means being responsive to movement of said timer to its cold position to actuate said switch means to reenergize said auxiliary heater to reheat said timer and cause it to return to its hot position and said control means being responsive to the return of said timer to its hot position to release said latching means to permit said carriers to return to receiving position.

5. A toaster according to claim 4 including a thermally responsive element responsive to rises in toaster temperature to vary the action of said timer so as to shorten the toasting interval as the toaster temperature rises.

6. A toaster according to claim 4 including manually actuatable means to vary the action of said timer to lengthen or shorten the toasting interval.

7. A toaster according to claim 4 including a thermally responsive element responsive to rises in toaster temperature for varying the hot position of said timer so as to shorten the toasting interval with rises in toaster temperature.

8. A toaster comprising, bread carriers movable from a receiving to a toasting position, main heaters for performing the toasting function, a thermal timer movable from a cold position to a hot position when heated and back to its cold position as it cools, an auxiliary heater for said timer, switch means operative to energize said auxiliary heater when said carriers are in receiving position to heat said timer and cause it to move to its hot position, said switch means being responsive to movement of said timer toward and away from its hot position to intermittently deenergize and energize said auxiliary heater to maintain said timer in its hot position as long as said carriers remain in receiving position, means for moving said carriers to toasting position, means for latching said carriers in toasting position, and control means responsive to movement of said carriers to toasting position and operative to energize said main heaters and to deenergize said auxiliary heater to permit said timer to cool and move to its cold position, said control means being responsive to movement of said timer to its cold position to actuate said switch means to reenergize said auxiliary heater to reheat said timer to cause it to return to its hot position and said control means being responsive to the return of said timer to its hot position to release said latching means.

9. A toaster according to claim 8 including means to vary the position of said switch means so as to vary the hot position of said timer and thus vary the duration of the toasting interval.

10. A toaster in accordance with claim 8 including a thermally responsive element responsive to toaster temperature for varying the action of said switch means to vary the hot position of said timer so as to shorten the toasting interval with rises in toaster temperature.

11. A toaster according to claim 8 including manually actuatable means to vary the position of said switch means so as to vary the hot position of said timer and thus vary the duration of the toasting interval so as to adjust the toaster for making light, dark, or medium toast.

12. A toaster comprising; carriers movable from a receiving to a toasting position; a thermal timer for timing the duration of a toasting interval; said timer being constructed to pass through a heating up period, a cooling off period and another heating up period in timing the duration of said toasting interval; said timer being movable from a cold position to a hot position when heated and back to its cold position upon cooling; means for moving said carriers to toasting position; control means responsive to movement of said carriers to toasting position for initiating a toasting interval; means for applying heat to said timer; said control means being responsive to movement of said carriers to toasting position to activate said heat applying means to cause said timer to pass through a first heating up period and move from its cold position to its hot position; said control means being responsive to movement of said timer to its hot position to deactivate said heat applying means to permit said timer to cool so as to pass through its cooling off period and return to its cold position; said control means being responsive to the return of said timer to its cold position to reactivate said heat applying means to cause said timer to pass through a second heating up period and return to its hot position and said control means being responsive to movement of said timer to its hot position for terminating said toasting interval.

13. A toaster according to claim 12 including means to vary the duration of one of said periods.

14. A toaster comprising, carriers movable from receiving to toasting position, a thermal timer for timing the duration of a toasting interval, a heater for said thermal timer, said timer having a part movable from a cold position to a hot position upon being heated and back to its cold position upon cooling, an on-off switch for said heater, means actuated by movement of the movable part of said timer toward and away from its hot position for intermittently actuating said switch to deenergize and reenergize said heater so as to maintain said timer in its hot condition, means for moving said carrier to toasting position, and control means responsive to movement of said carriers to toasting position to initiate a toasting interval and to deenergize said heater independently of said switch to cause said timer to cool and the movable part thereof to move to its cold position, said control means being responsive to movement of said part to its cold position for reenergizing said heater to reheat said timer and cause its movable part to return to its hot position and said control means being responsive to the return of said part to its hot position for terminating said toasting interval.

15. A toaster according to claim 14 including means for bodily moving said on-off switch toward and away from the movable part of said timer to vary its hot position and thereby vary the duration of said toasting interval.

16. A toaster according to claim 14 including manually actuatable means and means responsive to toaster temperature for bodily moving said on-off switch relative to the movable part of said timer to vary its hot position and thereby vary the duration of said toasting interval.

17. A thermal timer comprising, a bimetallic element rigidly supported at one end, the free end of said bimetallic element being movable from a cold position to a hot position upon being heated and back to its cold position upon cooling, a heater for said bimetallic element, a pair of overcenter toggle mechanisms adapted to be operated by the free end of said bimetallic element and being movable from an upper overcenter position to a lower overcenter position and vice versa, means for intermittently energizing and deenergizing said heater to maintain said bimetallic element hot, means for restraining movement of the free end of said bimetallic element towards its hot position, said restraining means being operable to hold both of said toggle mechanisms in their upper overcenter positions, means for completely deenergizing said heater and simultaneously releasing said restraining means to permit the free end of said bimetallic element to immediately move to its hot position so as to immediately move both of said toggle mechanisms to their lower overcenter positions and permit said bimetallic element to cool so that its free end will return to its cold position, a latch for holding said restraining means in non-restraining position, means actuated by movement of the free end of said bimetallic element to its cold position for returning one of said toggle mechanisms to its upper overcenter position while the other remains in its lower overcenter position, means actuated by movement of the free end of said bimetallic element to its cold position for reenergizing said heater to cause the free end of said bimetallic element to move towards its hot position, a latch release lever operable by the return of the free end of said bimetallic element to its hot position for releasing said latch and being constructed to freely pass the free end of said bimetallic element in its movement from its hot position to its cold position, means actuated by the release of said latch for returning said restraining means to its restraining position so as to positively move the free end of said bimetallic element to its cold position and both of said toggle mechanisms to their upper overcenter positions and means actuated by movement of said restraining means to its restraining position for deenergizing said heater and immediately reenergizing it so as to maintain said bimetallic element in a hot condition ready for a succeeding timing action.

18. A thermal timer comprising, a bimetallic element rigidly supported at one end and being free to deflect at its other end in opposite directions to a lower hot position and an upper cold position, a heater for said bimetallic element, means for restraining movement of the free end of said bimetallic element towards its hot position whereby the center portion of said bimetallic element will bow upwardly when said bimetallic element is heated, a normally closed on-off switch mounted between the fixed and free ends of said bimetallic element in a position to be opened by the center portion of said bimetallic element as it bows upwardly, said switch being connected to energize said heater when closed and to deenergize said heater when open whereby said bimetallic element is maintained in a hot condition, manual means for removing said restraining means to permit the free end of said bimetallic element to quickly move to its lower hot position, means actuated by movement of the free end of said bimetallic element to its hot position for deenergizing said heater independently of said switch to permit said bimetallic element to cool so that its free end will return to its cold position, means actuated by the return of the free end of said bimetallic element to its cold position for again energizing said heater to reheat said bimetallic element and cause its free end to return to its hot position and means responsive to the return of the free end of said bimetallic element to its hot position for returning said restraining means to its restraining position so as to maintain said bimetallic element in hot condition ready for a succeeding timing operation.

19. A timer according to claim 18 including means for moving said switch bodily toward and away from the central portion of said bimetallic element so as to vary the upper temperature limit of said bimetallic element.

20. A toaster comprising, carriers movable from receiving to toasting position, a thermal timer having a hot position and a cold position for timing the duration of a toasting interval, a heater for said timer, control means operative to intermittently energize and deenergize said heater to maintain said timer in a hot condition, means for moving said carriers to toasting position and means for latching said carriers in toasting position, said control means being responsive to movement of said carriers to toasting position for completely deenergizing said heater to cause said timer to cool and move to its cold position, said control means being responsive to movement of said timer to its cold position for reenergizing said heater to heat said timer and cause it to return to its hot position, said control means being responsive to the return of said timer to its hot position to release said latch means and said control means being responsive to the release of said latch means for deenergizing said heater and for immediately reenergizing it so as to condition said timer for timing a succeeding toasting interval.

21. A toaster comprising, carriers movable from a receiving to a toasting position, a thermal timer having a hot position and a cold position for timing the duration of a toasting interval, a heater for said timer, first and second electrical circuits each including said heater, means for moving said carriers to toasting position to initiate a toasting interval and control means operative prior to the movement of said carriers to toasting position for closing said first circuit so to as maintain said timer hot, said control means being responsive to movement of said carriers to toasting position for opening said first circuit to permit said timer to cool and move to its cold position, said control means being responsive to movement of said timer to its cold position for closing said second circuit to heat said timer and cause it to return to its hot position, said control means being responsive to the return of said timer to its hot position for terminating said toasting interval and being responsive to the termination of said toasting interval for opening said second circuit and closing said first circuit so as to maintain said timer hot.

22. A toaster comprising, carriers movable from receiving to toasting position, a thermal timer having a hot position and a cold position for timing a toasting interval, a heater for said timer, control means for energizing said heater to cause said timer to move to its hot position, means for moving said carriers to toasting position to initiate a toasting operation, said control means being operative to deenergize said heater to permit said timer to cool and move to its cold position and a pair of sequentially operated latches for holding said carriers in toasting position, said control means including a snap acting toggle mechanism having an upper overcenter position and a lower overcenter position, said timer being positioned to move said toggle mechanism to its lower overcenter position in moving from its hot position to its cold position, said toggle mechanism being positioned to release one of said latches in moving to its lower overcenter position, means actuated by movement of said toggle mechanism to its lower overcenter position for reenergizing said heater to cause said timer to return to its hot position and return said toggle mechanism to its upper overcenter position and means responsive to the release of said first latch for moving said second latch into the path of return movement of said toggle mechanism whereby the return of said toggle mechanism to its upper overcenter position will release said second latch and terminate the toasting interval.

23. A timer comprising, a bimetallic element fixed at one end and free at its other end to flex in opposite directions upon being heated and upon cooling, means for intermittently heating said bimetallic element to maintain its free end in its hot position, a snap acting toggle mechanism having an upper overcenter position and a lower overcenter position, one arm of said toggle mechanism having a forked end straddling the free end of said bimetallic element, a pair of latches positioned to be operated by said toggle mechanism, manual means for terminating the heating of said bimetallic element to cause its free end to move to its cold position and move said toggle mechanism to its lower overcenter position, a first one of said latches being positioned to be released by movement of said toggle mechanism to its lower overcenter position, means operated by movement of said toggle mechanism to its lower overcenter position for reheating said timer to cause its free end to return to its hot position and return said toggle mechanism to its upper overcenter position, and means responsive to the release of said first latch for moving the second latch into the return path of movement of said toggle mechanism whereby said second latch is released upon the return of said toggle mechanism to its upper overcenter position.

24. A toaster comprising, carriers movable from a receiving to a toasting position, a thermal timer for timing the duration of a toasting interval, said timer being constructed to pass through a cooling off period and a heating up period in timing the duration of said toasting interval, said timer being movable from a cold position to a hot position upon being heated and back to its cold position upon cooling, means for moving said carriers to toasting position, first control means responsive to movement of said carriers to toasting position for initiating a toasting interval, means for applying heat to said timer, and second control means to activate said heat applying means to cause said timer to move to its hot position when said carriers are in either receiving or toasting position, said second control means being operative to deactivate said heat applying means to cause said timer to pass through a cooling off period and return to its cold position when said carriers are in toasting position, said second control means being responsive to movement of said timer to its cold position to reactivate said heat applying means to cause said timer to pass through a heating up period and return to its hot position, and said second control means being responsive to the return of said timer to its hot position for terminating said toasting interval.

25. A toaster comprising, carriers movable from receiving to toasting position, a thermal timer having a hot position and a cold position for timing a toasting interval, a heater for said timer, control means operative to energize said heater to cause said timer to move to its hot position, means for moving said carriers to toasting position to initiate a toasting operation, said control means being operative to deenergize said heater to permit said timer to cool and move to its cold position and a pair of sequentially operative latches for holding said carriers in toasting position, said control means being responsive to movement of said timer to cold position for releasing one of said latches and to reenergize said heater to cause said timer to return to its hot position, said control means being responsive to the return of said timer to its hot position to release the other of said latches to terminate the toasting interval, and said control means being responsive to movement of said timer to its hot position to deenergize said heater and to immediately reenergize it so as to maintain said timer in hot position between succeeding toasting intervals.

OTIS B. SUTTON.
CURTIS C. COONS.

(References on following page)

REFERENCES CITED

The following references are of record in the file of this patent:

UNITED STATES PATENTS

| Number | Name | Date |
|---|---|---|
| 2,250,997 | Miller | July 29, 1941 |
| 2,254,687 | Koci | Sept. 2, 1941 |
| 2,262,279 | Gomersall | Nov. 11, 1941 |
| 2,271,520 | Strauss | Feb. 3, 1942 |
| 2,274,810 | Sardeson | Mar. 3, 1942 |
| 2,302,117 | Gomersall | Nov. 17, 1942 |
| 2,320,347 | Brosseau et al. | June 1, 1943 |
| 2,325,551 | Scharf | July 27, 1943 |
| 2,337,124 | Olving | Dec. 21, 1943 |
| 2,344,842 | Weeks | Mar. 21, 1944 |
| 2,436,735 | Walder et al. | Feb. 24, 1948 |